(12) United States Patent
Chen et al.

(10) Patent No.: US 8,800,022 B2
(45) Date of Patent: Aug. 5, 2014

(54) METHOD AND SYSTEM FOR HANDLING SECURITY IN AN IP MULTIMEDIA GATEWAY

(75) Inventors: Xuemin Chen, Rancho Santa Fe, CA (US); Gordon Yong Li, San Diego, CA (US); Sam Anderson, Surrey (CA); Pierre Couillaud, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 559 days.

(21) Appl. No.: 12/828,652

(22) Filed: Jul. 1, 2010

(65) Prior Publication Data

US 2012/0005742 A1 Jan. 5, 2012

(51) Int. Cl.
*H04L 9/00* (2006.01)

(52) U.S. Cl.
USPC .............................................. 726/12; 726/11

(58) Field of Classification Search
USPC ..................................................... 726/11–12
See application file for complete search history.

(56) References Cited

U.S. PATENT DOCUMENTS

| 5,586,260 | A | 12/1996 | Hu | |
|---|---|---|---|---|
| 7,881,338 | B2 * | 2/2011 | Damola et al. | 370/466 |
| 2006/0173968 | A1 * | 8/2006 | Vaarala et al. | 709/214 |
| 2008/0168523 | A1 * | 7/2008 | Ansari et al. | 725/131 |

FOREIGN PATENT DOCUMENTS

| EP | 1326365 | * | 9/2003 |
|---|---|---|---|
| EP | 1326365 A1 | | 9/2003 |

OTHER PUBLICATIONS

European Search Report in related copending European application No. 11005274.3, mailed Oct. 4, 2011.
Official Korean Office Action mailed Dec. 3, 2012.

* cited by examiner

*Primary Examiner* — Ghazal Shehni
(74) *Attorney, Agent, or Firm* — Foley & Lardner LLP; Christopher J. McKenna; Paul M. H. Pua

(57) ABSTRACT

An IP multimedia gateway (IMG) may be operable to identify a client device which may not currently possess a security capability that is compatible with a security capability of a service manager for receiving a service from the service manager. A security process between the client device and the service manager may be enabled by the IMG to enable the client device to receive the service from the service manager. The client device may be local to the IMG or remote with respect to the IMG. The IMG may enable an authentication process between the client device and the service manager by performing authentication translation. The IMG may enable a cryptography process between the client device and the service manager by performing cryptography translation. The IMG may enable an authorization process for authorizing the client device to access a particular content by performing access control conversion.

22 Claims, 9 Drawing Sheets

METHOD AND SYSTEM FOR HANDLING SECURITY IN AN IP MULTIMEDIA GATEWAY

CROSS-REFERENCE TO RELATED APPLICATIONS/INCORPORATION BY REFERENCE

This application makes reference to:
U.S. patent application Ser. No. 12/829,145, filed on Jul. 1, 2010;
U.S. patent application Ser. No. 12/829,179, filed on Jul. 1, 2010;
U.S. patent application Ser. No. 12/829,212, filed on Jul. 1, 2010;
U.S. patent application Ser. No. 12/828,549, filed on Jul. 1, 2010;
U.S. patent application Ser. No. 12/837,045, filed on Jul. 15, 2010;
U.S. patent application Ser. No. 12/837,052, filed on Jul. 15, 2010;
U.S. patent application Ser. No. 12/837,089, filed on Jul. 15, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for handling security in an IP multimedia gateway.

BACKGROUND OF THE INVENTION

Telecommunication technologies have evolved from analog to digital technologies, and continues to evolve from circuit switched to packet switched, from connection oriented packet switching to connectionless packet switching, and from narrow band application to broadband applications. The accompanied evolution in telecommunication technologies has significantly advanced operators' capability to offer broadband, IP-based multimedia services ranging from entertainment and lifestyle applications such as mobile TV and mobile payment to professional services such as video conferencing and real-time data exchange.

IP multimedia subsystem (IMS) defines an architectural framework for the deployment of IP multimedia services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transmits real-time data such as audio and video data. RTP does not exclusively guarantee real-time delivery of data, but it does provide mechanisms for the sending and receiving applications to support streaming data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for handling security in an IP multimedia gateway, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for handling security in an IP multimedia gateway. In various embodiments of the invention, an IP multimedia gateway (IMG) may be operable to identify a client device which may be communicatively coupled to the IMG, and may not currently possess a security capability that is compatible with a security capability of a service manager to enable secure communication with and/or receiving of a service from the service manager. A security process between the client device and the service manager may be enabled by the IMG to enable the client device to receive the service from the service manager. In this regard, for example, a location of the client device may be local and/or remote with respect to a location of the IMG.

In an exemplary embodiment of the invention, the identified client device may support a first authentication method which is different from a second authentication method that may be required by the service manager. In this instance, the IMG may be operable to enable the security process between the client device and the service manager, which may be, for example, an authentication, by performing authentication translation between the first authentication method and the second authentication method.

In an exemplary embodiment of the invention, the identified client device may use a first cryptography method which is different from a second cryptography method that is used by the service manager. In this instance, the IMG may be operable to enable the security process between the client device and the service manager, which may be, for example, a cryptography process, by performing cryptography translation between the first cryptography method and the second cryptography method.

In another exemplary embodiment of the invention, the identified client device may not have an authorization to access particular content received from the service manager. The particular content is accessible to one or more of other client devices which may have the authorization to access the particular content. In this instance, for example, the IMG may be operable to enable the security process between the client device and the service manager, which may be, for example, an authorization process, by performing access control conversion on the particular content for the client device. At the same time, the particular content may remain accessible to one or more of the other client devices which may have the authorization to access the particular content. In this regard, for example, the IMG may be operable to determine a billing information associated with the particular content for authorizing the client device to access the particular content.

Figure 1:
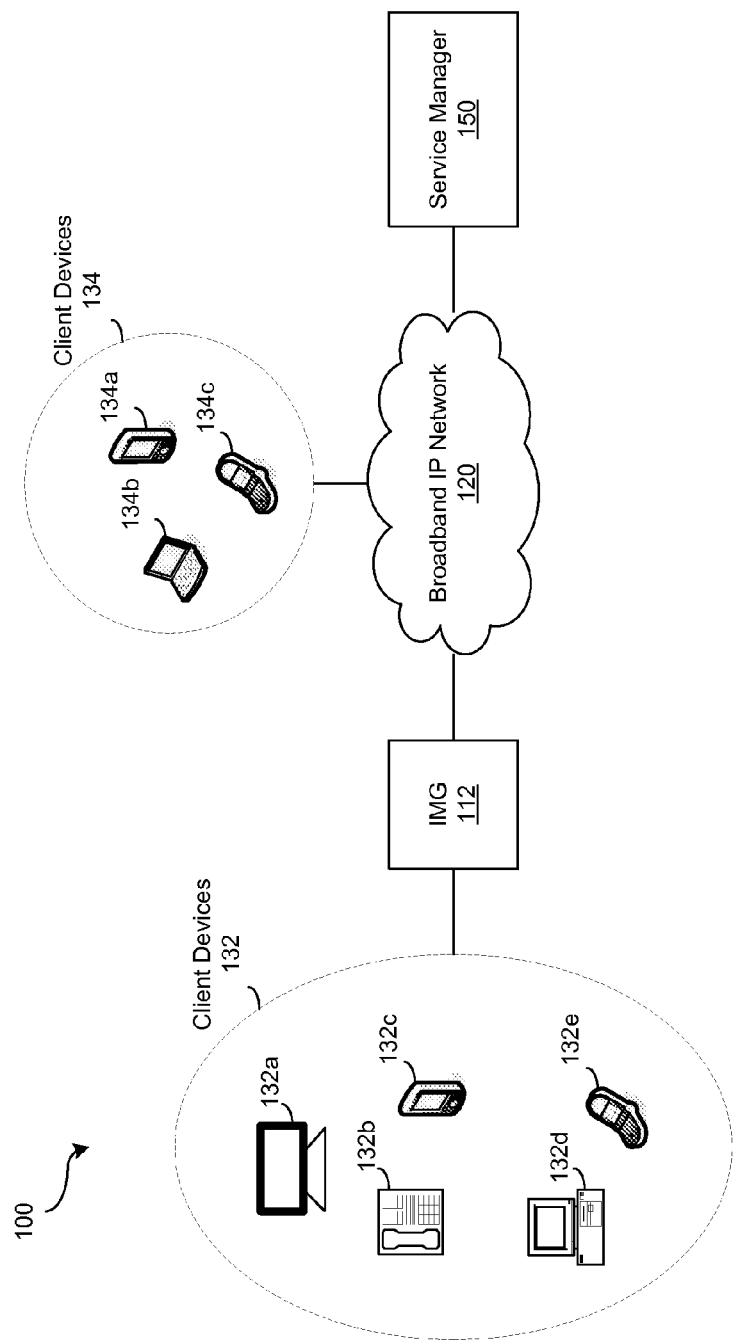
FIG. 1 is a block diagram illustrating an exemplary communication system that is operable to provide handling security in an IP multimedia gateway, in accordance with an embodiment of the invention.

FIG. 1 is a block diagram illustrating an exemplary communication system that is operable to provide handling security in an IP multimedia gateway, in accordance with an embodiment of the invention. Referring to FIG. 1, there is shown a communication system 100. The communication system 100 may comprise an IP multimedia gateway (IMG) 112, a broadband IP network 120, a plurality of client devices 132a-132e, 134a-134c, which are collectively referred to herein as client devices 132 and 134 respectively and a service manager 150.

The IMG 112 may comprise suitable logic, circuitry, interfaces and/or code that may be operable to connect the client devices 132 to the broadband IP network 120 for services of interest. A service may be described or represented by the service type and the service class. The type of a service refers to as the type of information to be transferred such as data, voice, text or video for the service. A service with a given service type may be classified into a plurality of exemplary scheduling service classes, namely, data services for Internet access and messaging, conversational services for carrier-grade voice and/or video calls and conferences, video services for TV, video and music streaming, gaming services for users to interact with one another via a central server, and corporate VPN services for access to enterprise intranet/email. Specific requirements may be placed on access networks of the client devices 132 and the broadband IP network 120 for each service type and/or class to ensure desired end-to-end quality of service (QoS). The service requirements on access networks of the client devices 132 and the broadband IP network 120 may comprise, for example, system timing, CODEC, transmission rates, power-saving mechanisms, security profiles and content types.

The IMG 112 may be, for example, an IP multimedia residential gateway (IMRG) which may be located at a residential location. The IMG 112 may be located in non-residential location comprising, for example, a commercial building, an office, an office complex, an apartment building and/or a factory.

In various exemplary embodiments of the invention, the IMG 112 may be operable to integrate local client devices as well as remote client devices to the broadband IP network 120. Client devices such as the client devices 132a-132e that may access the IMG 112 via device-dependent interfaces are referred to as local client devices for the IMG 112. A device-dependent interface may generally represent the PHY and MAC functionality of a particular access technology such as, for example, Ethernet, Wi-Fi, Bluetooth, cordless, and/or Femtocell. Client devices such as the client devices 134a-134c that may access the IMG 112 remotely via device-independent interfaces such as the broadband IP network 120 are referred to as remote client devices for the IMG 112.

In an exemplary embodiment of the invention, the IMG 112 may be operable to identify a client device such as the client device 132a which may not currently possess a security capability that is compatible with a security capability of a service manager such as the service manager 150 for handling and/or receiving a service from the service manager 150. A security process between the client device 132a and the service manager 150 may be enabled by the IMG 112 for allowing the client device 132a to receive the service from the service manager 150. In this regard, for example, a location of the client device such as the client device 132a may be local with respect to a location of the IMG 112. A location of the client device such as the client device 134a may be remote with respect to a location of the IMG 112.

A client device such as the client device 132a may comprise suitable logic, circuitry, interfaces and/or code that may be operable to receive services from the service manager 150 via the broadband IP network 120 and the IMG 112. In various exemplary embodiments of the invention, the client device 132a may be operable to utilize an access technology specific interface such as Bluetooth, LTE, WiFi and/or Ethernet to communicate with the IMG 112 for services offered by the service provider 150 via the broadband IP network 120. The client device 132a may also be operable to communicate or exchange information with other client devices registered to the IMG 112. In this regard, the client device 132a may share information with local client devices such as client devices 132b-132e as well as remote client devices such as the client devices 134a-134c. The client device 132a may be dynamically configured to receive services via the broadband IP network 120 as well as networked client devices such as the client device 132e.

The service manager 150 may comprise suitable logic, circuitry, interfaces and/or code that may be operable to provide IP-based services to the client devices 132, 134 via the broadband IP network 120 and the IMG 112. In this regard, the server provider 150 may be configured to deliver carrier-grade as well as non-carrier-grade broadband access services to the client devices 132, 134. The server provider 150 may be operable to schedule delivery of carrier-grade services to ensure service integrity. Non-carrier-grade services may be delivered when needed without reliability and stability ensured, for example.

The broadband IP network 120 may comprise suitable logic, circuitry, interfaces and/or code that may be operable to provide broadband communication via various wired and/or wireless technologies such as, for example, T1/E1, DSL, cable modem, FTTx, PLC and/or WiMAX. In an exemplary embodiment of the invention, the broadband IP network 120 may be operable to provide communication between the service manager 150 and the IMG 112.

In operation, an IMG 112 may be operable to identify a client device such as the client device 132a which may not possess a security capability that is compatible with a security capability of a service manager such as the service manager 150 for receiving a service from the service manager 150. For example, the IMG 112 may identify one or more client devices such as the client device 132a which may not have a current capability to securely communicate with and/or securely consume content from the service manager 150. A security process between the client device 132a and the service manager 150 may be enabled by the IMG 112 for allowing the client device 132a to receive the service from the service manager 150. In this regard, for example, a location of the client device such as the client device 132a may be local with respect to a location of the IMG 112. A location of the client device such as the client device 134a may be remote with respect to a location of the IMG 112.

In an exemplary embodiment of the invention, the identified client device 132a may support a first authentication method which is different from a second authentication method that may be required by the service manager 150. In this instance, the IMG 112 may be operable to enable the security process between the client device 132a and the service manager 150, which may be, for example, an authentication process, by performing an authentication translation between the first authentication method and the second authentication method. In this regard, for example, the client device 132a may only support a password login while the service manager 150 may require a digital certificate as an authentication credential. The client device 132a may use the password and a user ID to log into the IMG 112. The IMG 112 may be operable to perform the authentication translation between the password and the user ID of the client device 132a and the digital certificate. The IMG 112 may map the password and the user ID of the client device 132a with a digital certificate of the IMG 112 and allow the service manager 150 to perform the authentication using the digital certificate of the IMG 112.

In an exemplary embodiment of the invention, the identified client device 132a may use a first cryptography method which is different from a second cryptography method that is used by the service manager 150. In this instance, the IMG 112 may be operable to enable the security process between the client device 132a and the service manager 150, which may be, for example, a cryptography process, by performing cryptography translation between the first cryptography method and the second cryptography method. In this regard, for example, the client device 132a may only support a first cipher while the service manager 150 may utilize a second cipher that may be different from the first cipher. A cipher is a pair of algorithm which may create an encryption and a reversing decryption. The IMG 112 may be operable to perform cryptography translation between the first cipher and the second cipher so as to enable a cryptography process between the client device 132a and the service manager 150.

In another exemplary embodiment of the invention, the identified client device 132a may not have an authorization to access particular content received from the service manager 150. The particular content is accessible to one or more of other client devices such as the client device 132d which may have the authorization to access the particular content. In this instance, for example, the IMG 112 may be operable to enable an authorization process for authorizing the client device 132a to access the particular content by performing an access control conversion on the particular content for the client device 132a. At the same time, the IMG 112 may be operable to keep the particular content accessible to one or more of the other client devices such as the client device 132d which may have the authorization to access the particular content. In this regard, for example, the client device 132d may have authorization to receive a particular video content from the service manager 150. The particular video content may comprise an access control mechanism such as, for example, a conditional access (CA) such that the client device 132a may not have authorization to access the particular video content at the same time. The conditional access (CA) provides protection of content by requiring certain criteria to be met before granting access to the content. The IMG 112 may be operable to perform an access control conversion. For example, the IMG 112 may convert the CA to multiple digital rights managements (DRMs) for the particular video content so as to serve multiple clients such as the client device 132d and the client device 132a with the particular video content at the same time. The DRM is an access control mechanism which may be used to manage rights applicable to permissions over digital content such as the particular audio and/or video content.

In an exemplary embodiment of the invention, the IMG 112 may be operable to determine a billing information associated with the particular content for authorizing the client device 132a to access the particular content. For example, the client device 132a may be authorized to access the particular audio and/or video content which is tagged with a billing price that may be different from the billing price for the client device 132d.

Figure 2:
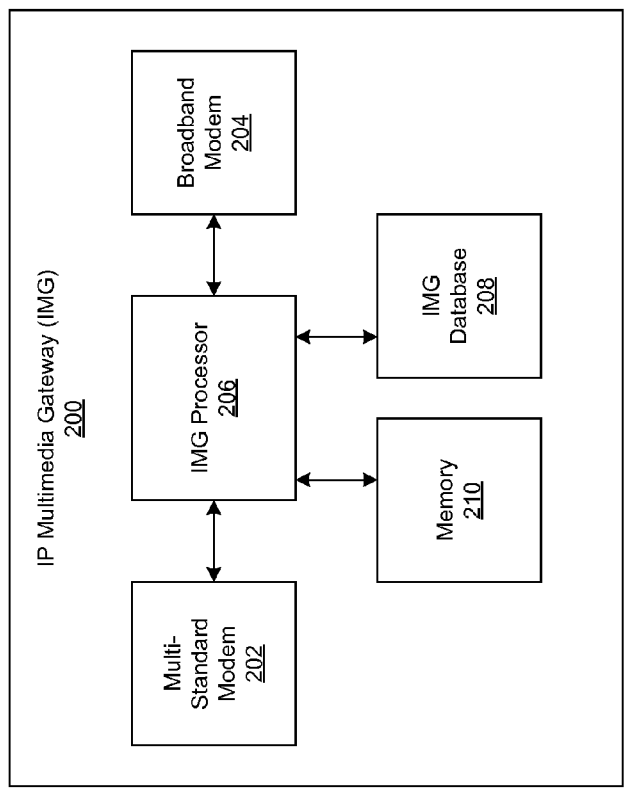
FIG. 2 is a block diagram illustrating an exemplary IP multimedia gateway (IMG) that is operable to handle security in the IP multimedia gateway, in accordance with an embodiment of the invention.

FIG. 2 is a block diagram illustrating an exemplary IP multimedia gateway (IMG) that is operable to handle security in the IP multimedia gateway, in accordance with an embodiment of the invention. Referring to FIG. 2, there is shown an IMG 200. The IMG 200 may comprise a multi-standard modem 202, a broadband modem 204, an IMG processor 206, an IMG database 208 and a memory 210.

The multi-standard modem 202 may comprise suitable logic, circuitry, interfaces and/or code that may be operable to communicate with a plurality of client devices such as the client devices 132a-132e utilizing a device-dependent interface such as, for example, Ethernet, Wi-Fi, Bluetooth, cordless, and/or Femtocell.

The broadband modem 204 may comprise suitable logic, circuitry, interfaces and/or code that may be operable to transmit voice and/or data in adherence with one or more internet protocol (IP) broadband standard. The broadband modem 204 may be operable to transmit and/or receive voice and/or data to and/or from the broadband IP networks 120 over broadband connections such as, for example, T1/E1 line, DSL, Cable, FTTx, PLC and WiMAX. The broadband modem 204 may dynamically configure one or more network interfaces utilized within the broadband modem 204 towards to the broadband IP network 120. For example, in instances where the broadband modem 204 is signaled to exchange information with the VoIP softswitch network, the broadband modem 204 may be configured to utilize FTTx as an access solution to the VoIP softswitch network.

The IMG processor 206 may comprise suitable logic, circuitry, interfaces and/or code that may be operable to perform a variety of signal processing tasks to maintain or manage communication between associated client devices 132a-132e, 134a-134c and the broadband IP network 120, and/or among associated client devices 132a-132e, 134a-134c. The IMG processor 206 may be operable to perform a plurality of functions such as, for example, client device interface, client device adaptation, internal routing and control, remote access, broadband IP network adaptation and/or broadband IP network interface.

In an exemplary embodiment of the invention, the IMG processor 206 may be operable to identify a client device such as the client device 132*a* which may not possess a security capability that is compatible with a security capability of a service manager such as the service manager 150 for receiving a service from the service manager 150. A security process between the client device 132*a* and the service manager 150 may be enabled by the IMG processor 206 for allowing the client device 132*a* to receive the service from the service manager 150. In this regard, for example, a location of the client device such as the client device 132*a* may be local with respect to a location of the IMG 200. A location of the client device such as the client device 134*a* may be remote with respect to a location of the IMG 200.

In an exemplary embodiment of the invention, the identified client device 132*a* may support a first authentication method which is different from a second authentication method that may be required by the service provider 150. In this instance, the IMG processor 206 may enable secure processing and/or communication between the client device 132*a* and the service manager 150, which may be, for example, an authentication, by performing an authentication translation between the first authentication method and the second authentication method. In this regard, for example, the client device 132*a* may only support a password login while the service manager 150 may require a digital certificate as an authentication credential. The client device 132*a* may use the password and a user ID to log into the IMG 200. The IMG processor 206 may be operable to perform the authentication translation between the password and the user ID of the client device 132*a* and the digital certificate. The IMG processor 206 may map the password and the user ID of the client device 132*a* with a digital certificate of the IMG 200 and allow the service manager 150 to perform the authentication using the digital certificate of the IMG 200.

In an exemplary embodiment of the invention, the identified client device 132*a* may use a first cryptography method which is different from a second cryptography method that is used by the service manager 150. In this instance, the IMG processor 206 may enable the security process to facilitate secure processing and/or communication between the client device 132*a* and the service manager 150, which may be, for example, a cryptography process, by performing cryptography translation between the first cryptography method and the second cryptography method. In this regard, for example, the client device 132*a* may only support a first cipher while the service manager 150 may utilize a second cipher that may be different from the first cipher. The IMG processor 206 may be operable to perform cryptography translation between the first cipher and the second cipher so as to enable a cryptography process between the client device 132*a* and the service manager 150.

In another exemplary embodiment of the invention, the identified client device 132*a* may not have an authorization to access particular content received from the service manager 150. The particular content is accessible to one or more of other client devices such as the client device 132*d* which may have the authorization to access the particular content. In this instance, for example, the IMG processor 206 may be operable to enable an authorization process for authorizing the client device 132*a* to access the particular content by performing an access control conversion on the particular content for the client device 132*a*. In the mean time, the IMG processor 206 may be operable to keep the particular content accessible to one or more of the other client devices such as the client device 132*d* which may have the authorization to access the particular content. In this regard, for example, the client device 132*d* may have an authorization to receive a particular video content from the service manager 150. The particular video content may comprise an access control mechanism such as, for example, a conditional access (CA) such that the client device 132*a* may not have an authorization to access the particular video content at the same time. The IMG processor 206 may be operable to perform an access control conversion. For example, the IMG processor 206 may convert the CA to multiple digital rights managements (DRMs) for the particular video content so as to serve multiple clients such as the client device 132*d* and the client device 132*a* with the particular video content at the same time.

In an exemplary embodiment of the invention, the IMG processor 206 may be operable to determine a billing information associated with the particular content for authorizing the client device 132*a* to access the particular content. For example, the client device 132*a* may be authorized to access the particular video content which is tagged with a billing price that may be different from the billing price for the client device 132*d*.

The IMG database 208 may comprise suitable logic, circuitry, interfaces and/or code that may be operable to store and manage client device information and network information. In this regard, the IMG database 208 may comprise registration status information for associated client devices such as client devices 132*a*-132*e*, 134*a*-134*c*. The registration status for a client device pertaining to the IMG 200 may be a local client device such as the client device 132*a* or a remote client device such as the client device 134*a*. The IMG database 208 may be operable to track or collect client device capabilities and network capabilities. The collected capability information may be utilized to dynamically configure client devices 132*a*-132*e*, 134*a*-134*c* pertaining to the IMG 200.

The memory 210 may comprise suitable logic, circuitry, interfaces and/or code that may be operable to store information such as executable instructions and data that may be utilized by the IMG processor 206 to perform various functions of the IMG 200. For example, the memory 210 may be utilized to store processed data or content generated by the IMG processor 206. The memory 210 may comprise RAM, ROM, low latency nonvolatile memory such as flash memory and/or other suitable electronic data storage capable of storing data and instructions.

In operation, an IMG such as the IMG 200 may provide connections and/or interfaces for various client devices such as the client devices 132*a*-132*e* to a broadband IP network such as the broadband IP network 120. An IMG processor 206 in the IMG 200 may be operable to identify a client device such as the client device 132*a* which may not possess a security capability that is compatible with a security capability of a service manager such as the service manager 150 for receiving a service from the service manager 150. A security process between the client device 132*a* and the service manager 150 may be enabled by the IMG processor 206 for allowing the client device 132*a* to receive the service from the service manager 150. In this regard, for example, a location of the client device such as the client device 132*a* may be local with respect to a location of the IMG 200. A location of the client device such as the client device 134*a* may be remote with respect to a location of the IMG 200.

In an exemplary embodiment of the invention, the identified client device 132a may support a first authentication method which is different from a second authentication method that may be required by the service manager 150. In this instance, the IMG processor 206 may be operable to enable the security process that enables secure processing and/or communication between the client device 132a and the service manager 150, which may be, for example, an authentication, by performing an authentication translation between the first authentication method and the second authentication method. In this regard, for example, the client device 132a may only support a password login while the service manager 150 may require a digital certificate as an authentication credential. The client device 132a may use the password and a user ID to log into the IMG 200. The IMG processor 206 may be operable to perform the authentication translation between the password and the user ID of the client device 132a and the digital certificate. The IMG processor 206 may map the password and the user ID of the client device 132a with a digital certificate of the IMG 200 and allow the service manager 150 to perform the authentication using the digital certificate of the IMG 200.

In an exemplary embodiment of the invention, the identified client device 132a may use a first cryptography method which is different from a second cryptography method that is used by the service manager 150. In this instance, the IMG processor 206 may be operable to enable the security process between the client device 132a and the service manager 150, which may be, for example, a cryptography process, by performing cryptography translation between the first cryptography method and the second cryptography method. In this regard, for example, the client device 132a may only support a first cipher while the service manager 150 may utilize a second cipher that may be different from the first cipher. The IMG processor 206 may be operable to perform cryptography translation between the first cipher and the second cipher so as to enable a cryptography process between the client device 132a and the service manager 150.

In another exemplary embodiment of the invention, the identified client device 132a may not have authorization to access particular content received from the service manager 150. The particular content is accessible to one or more of other client devices such as the client device 132d which may have the authorization to access the particular content. In this instance, for example, the IMG processor 206 may be operable to enable an authorization process for authorizing the client device 132a to access the particular content by performing an access control conversion on the particular content for the client device 132a. In the mean time, the IMG processor 206 may be operable to keep the particular content accessible to one or more of the other client devices such as the client device 132d which may have the authorization to access the particular content. In this regard, for example, the client device 132d may have an authorization to receive a particular video content from the service manager 150. The particular video content may comprise an access control mechanism such as, for example, a conditional access (CA) such that the client device 132a may not have an authorization to access the particular video content at the same time. The IMG processor 206 may be operable to perform an access control conversion. For example, the IMG processor 206 may convert the CA to multiple digital rights managements (DRMs) for the particular video content so as to serve multiple clients such as the client device 132d and the client device 132a with the particular video content at the same time.

In an exemplary embodiment of the invention, the IMG processor 206 may be operable to determine a billing information associated with the particular content for authorizing the client device 132a to access the particular content. For example, the client device 132a may be authorized to access the particular video content which is tagged with a billing price that may be different from the billing price for the client device 132d.

Figure 3:
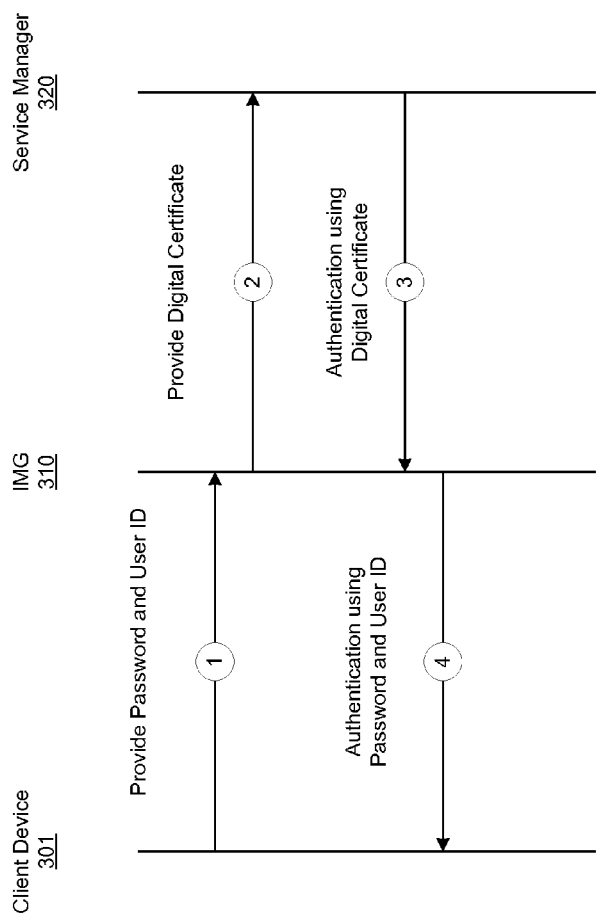
FIG. 3 is a flow diagram illustrating an exemplary authentication translation process, in accordance with an embodiment of the invention.

FIG. 3 is a flow diagram illustrating an exemplary authentication translation process, in accordance with an embodiment of the invention. Referring to FIG. 3, there is shown a client device 301, an IMG 310 and a service manager 320. The client device 301 may be substantially the same as the client device 132a described with respect to FIG. 1. The IMG 310 may be substantially the same as the IMG 112 described with respect to FIG. 1. The service manager 320 may be substantially the same as the service manager 150 described with respect to FIG. 1.

In an exemplary embodiment of the invention, the client device 301 may provide a password and a user ID to log into the IMG 310 as illustrated by the reference label 1. The IMG 310 may map the password and the user ID of the client device 301 with a digital certificate of the IMG 310 and provide the digital certificate to the service manager 320 as illustrated by the reference label 2. The service provider 320 may authenticate the IMG 310 using the digital certificate as illustrated by the reference label 3. The IMG 310 may authenticate the client device 301 using the password and the user ID as illustrated by the reference label 4.

Figure 4:
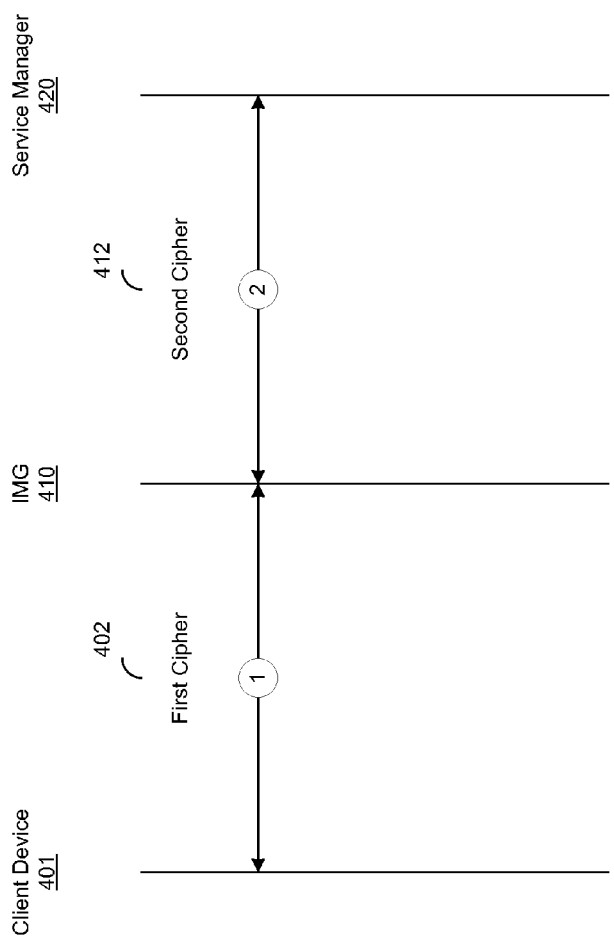
FIG. 4 is a flow diagram illustrating an exemplary cryptography translation process, in accordance with an embodiment of the invention.

FIG. 4 is a flow diagram illustrating an exemplary cryptography translation process, in accordance with an embodiment of the invention. Referring to FIG. 4, there is shown a client device 401, an IMG 410 and a service manager 420. The client device 401 may be substantially the same as the client device 132a described with respect to FIG. 1. The IMG 410 may be substantially the same as the IMG 112 described with respect to FIG. 1. The service manager 420 may be substantially the same as the service manager 150 described with respect to FIG. 1.

In an exemplary embodiment of the invention, the client device 401 may only support a first cipher 402 while the service manager 420 may utilize a second cipher 412 that may be different from the first cipher 402. The IMG 410 may perform cryptography translation between the first cipher 402 and the second cipher 412 so as to enable a cryptography process between the client device 401 and the service manager 420 as illustrated by the reference labels 1 and 2.

Figure 5:
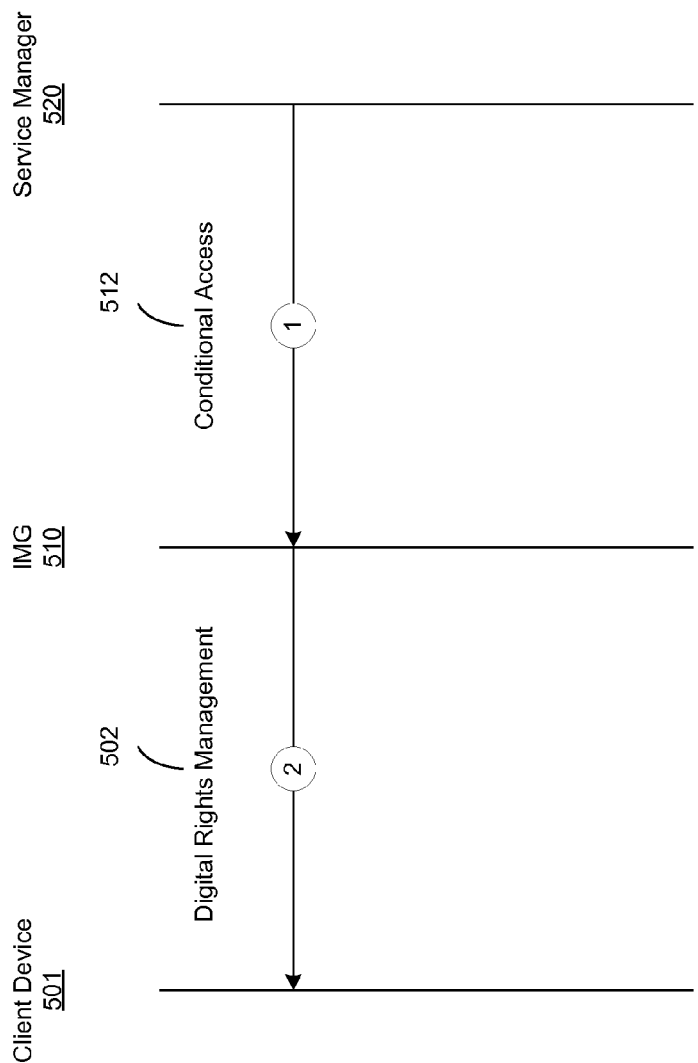
FIG. 5 is a flow diagram illustrating an exemplary access control conversion process, in accordance with an embodiment of the invention.

FIG. 5 is a flow diagram illustrating an exemplary access control conversion process, in accordance with an embodiment of the invention. Referring to FIG. 5, there is shown a client device 501, an IMG 510 and a service manager 520. The client device 501 may be substantially the same as the client device 132a described with respect to FIG. 1. The IMG 510 may be substantially the same as the IMG 112 described with respect to FIG. 1. The service manager 520 may be substantially the same as the service manager 150 described with respect to FIG. 1.

In an exemplary embodiment of the invention, the client device 501 may not have an authorization to access a particular video content which comprises a conditional access 512. The IMG 510 may perform access control conversion to convert the conditional access 512 to a digital rights management (DRM) 502 for the particular video content so as to enable the client device 501 to receive the particular video content as illustrated by the reference labels 1 and 2.

Figure 6:
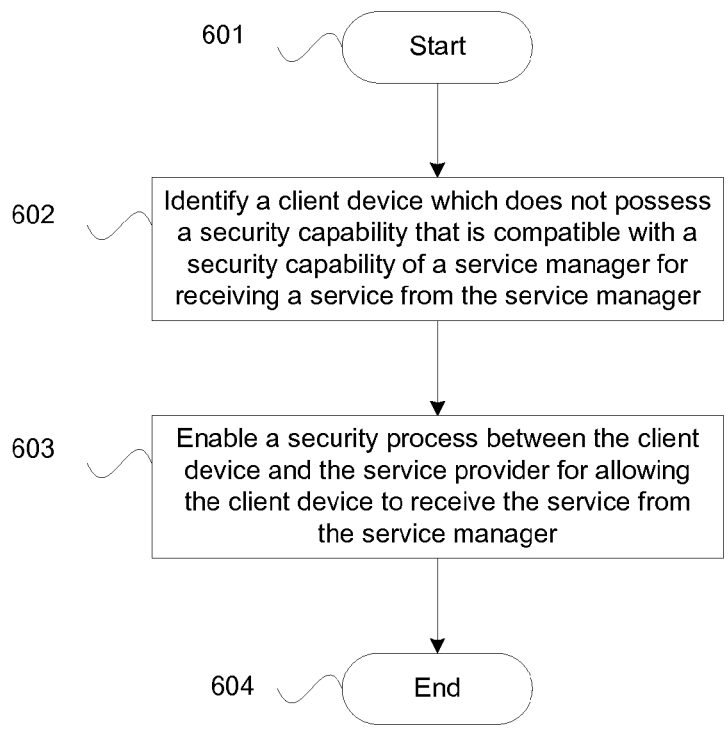
FIG. 6 is a flow chart illustrating exemplary steps for handling security in an IP multimedia gateway, in accordance with an embodiment of the invention.

FIG. 6 is a flow chart illustrating exemplary steps for handling security in an IP multimedia gateway, in accordance with an embodiment of the invention. Referring to FIG. 6, the exemplary steps start at step 601. In step 602, the IMG 112 may be operable to identify a client device 132a which may not possess a security capability that is compatible with a security capability of a service manager 150 for receiving a service from the service manager 150. In step 603, the IMG 112 may be operable to enable a security process that enables secure processing and/or communication between the client device 132a and the service manager 150 for allowing the client device 132a to receive the service from the service manager 150. The exemplary steps may proceed to the end step 604.

Figure 7:
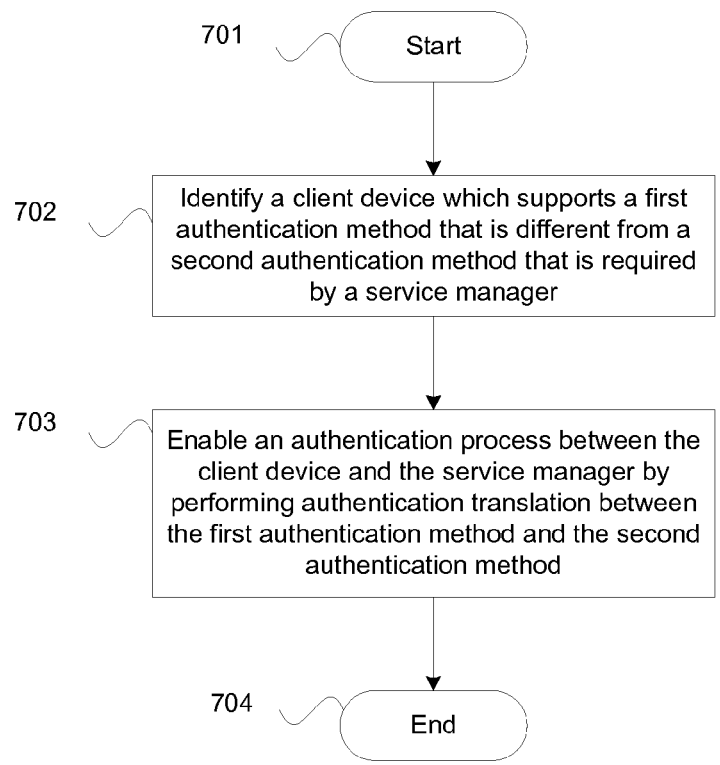
FIG. 7 is a flow chart illustrating exemplary steps for handling authentication in an IP multimedia gateway, in accordance with an embodiment of the invention.

FIG. 7 is a flow chart illustrating exemplary steps for handling authentication in an IP multimedia gateway, in accordance with an embodiment of the invention. Referring to FIG. 7, the exemplary steps start at step 701. In step 702, the IMG 112 may be operable to identify a client device 132a which may support a first authentication method that is different from a second authentication method that is required by a service manager 150. In step 703, the IMG 112 may be operable to enable an authentication process between the client device 132a and the service manager 150 by performing authentication translation between the first authentication method and the second authentication method. The exemplary steps may proceed to the end step 704.

Figure 8:
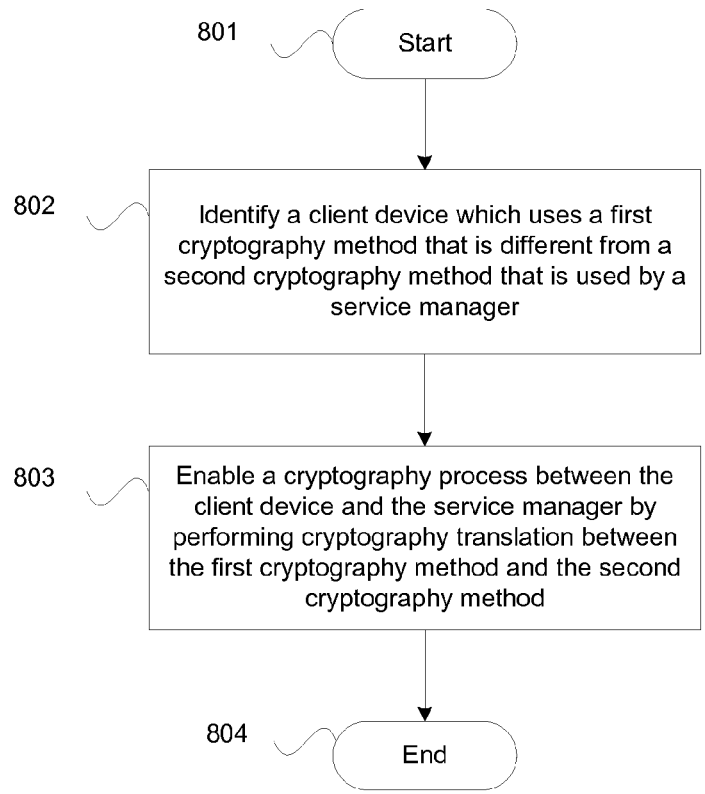
FIG. 8 is a flow chart illustrating exemplary steps for handling cryptography in an IP multimedia gateway, in accordance with an embodiment of the invention.

FIG. 8 is a flow chart illustrating exemplary steps for handling cryptography in an IP multimedia gateway, in accordance with an embodiment of the invention. Referring to FIG. 8, the exemplary steps start at step 801. In step 802, the IMG 112 may be operable to identify a client device 132a which may use a first cryptography method that is different from a second cryptography method that may be used by a service manager 150. In step 803, the IMG 112 may be operable to enable a cryptography process between the client device 132a and the service manager 150 by performing cryptography translation between the first cryptography method and the second cryptography method. The exemplary steps may proceed to the end step 804.

Figure 9:
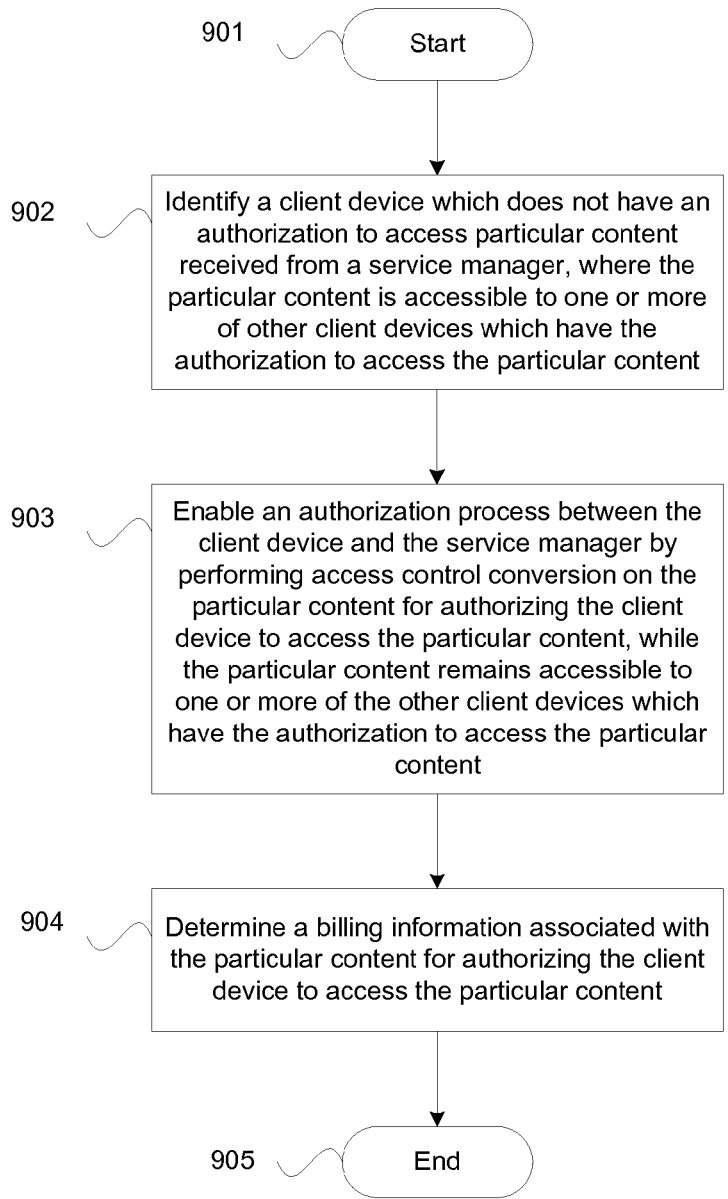
FIG. 9 is a flow chart illustrating exemplary steps for handling authorization in an IP multimedia gateway, in accordance with an embodiment of the invention.

FIG. 9 is a flow chart illustrating exemplary steps for handling authorization in an IP multimedia gateway, in accordance with an embodiment of the invention. Referring to FIG. 9, the exemplary steps start at step 901. In step 902, the IMG 112 may be operable to identify a client device 132a which may not have an authorization to access particular content received from a service manager 150. The particular content may be accessible to one or more of other client devices such as the client device 132d which may have the authorization to access the particular content. In step 903, the IMG 112 may be operable to enable an authorization process between the client device 132a and the service manager 150 by performing an access control conversion on the particular content for authorizing the client device 132a to access the particular content. The particular content may remain accessible to one or more of the other client devices such as the client device 132d which may have the authorization to access the particular content. In step 904, a billing information associated with the particular content may be determined by the IMG 112 for authorizing the client device 132a to access the particular content. The exemplary steps may proceed to the end step 905.

In various embodiments of the invention, an IMG 112 may be operable to identify a client device 132a which may be communicatively coupled to the IMG 112, and may not currently possess a security capability that is compatible with a security capability of a service manager 150 to enable secure communication with and/or receiving of a service from the service manager 150. A security process between the client device 132a and the service manager 150 may be enabled by the IMG 112 to enable the client device 132a to receive the service from the service manager 150. In this regard, for example, a location of the client device such as the client device 132a may be local with respect to a location of the IMG 112. A location of the client device such as the client device 134a may be remote with respect to a location of the IMG 112.

In an exemplary embodiment of the invention, the identified client device 132a may support a first authentication method which is different from a second authentication method that may be required by the service manager 150. In this instance, the IMG 112 may enable the security process to facilitate communication between the client device 132a and the service manager 150, which may be, for example, an authentication, by performing authentication translation between the first authentication method and the second authentication method.

In an exemplary embodiment of the invention, the identified client device 132 may use a first cryptography method which is different from a second cryptography method that is used by the service manager 150. In this instance, the IMG 112 may be operable to enable the security process between the client device 132a and the service manager 150, which may be, for example, a cryptography process, by performing cryptography translation between the first cryptography method and the second cryptography method.

In another exemplary embodiment of the invention, the identified client device 132a may not have an authorization to access particular content received from the service manager 150. The particular content is accessible to one or more of other client devices such as the client device 132d which may have the authorization to access the particular content. In this instance, for example, the IMG 112 may be operable to enable the security process between the client device 132a and the service manager 150, which may be, for example, an authorization process, by performing access control conversion on the particular content for the client device 132a. At the same time, the particular content may remain accessible to one or more of the other client devices such as the client device 132d which may have the authorization to access the particular content. In this regard, for example, the IMG 112 may be operable to determine a billing information associated with the particular content for authorizing the client device 132a to access the particular content.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for handling security in an IP multimedia gateway.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in an IP multimedia gateway (IMG):
   identifying a client device communicatively coupled to said IMG, the client device having a security capability incompatible with a security capability of a service manager;
   initiating a security translation process between a first cryptography method of said client device and a second cryptography method of said service manager to enable said client device to access content from said service manager, wherein said first cryptography method comprises a first authentication via a first cipher and said second cryptography method comprises a second authentication via a second cipher, wherein said first cipher is different from said second cipher.

2. The method according to claim 1, wherein a location of said client device is local with respect to a location of said IMG.

3. The method according to claim 1, wherein a location of said client device is remote with respect to a location of said IMG.

4. The method according to claim 1, wherein said client device supports a first authentication method which is different from a second authentication method that is required by said service manager.

5. The method according to claim 4, comprising enabling said security process between said client device and said service manager by performing authentication translation between said first authentication method and said second authentication method.

6. The method according to claim 1, wherein: said client device does not have an authorization to access particular content received from said service manager; and said particular content is accessible to one or more of other client devices which have said authorization to access said particular content.

7. The method according to claim 6, comprising enabling said security process between said client device and said service manager by performing access control conversion on said particular content for said client device, wherein said particular content remains accessible to said one or more of other client devices which have said authorization to access said particular content.

8. The method according to claim 7, comprising determining a billing information associated with said particular content for authorizing said client device to access said particular content.

9. The method according to claim 1, wherein said first cypher comprises an algorithm for performing encryption or decryption.

10. The method according to claim 1, wherein said second cypher comprises an algorithm for performing encryption or decryption.

11. A system for communication, the system comprising:
    at least one of a processor and a circuit in an IP multimedia gateway (IMG), configured to:
    identify a client device communicatively coupled to said IMG, the client device having a security capability incompatible with a security capability of a service manager; and
    initiate a security conversion process between a first authentication method of said client device and a second authentication method of said service manager to enable said client device to receive a service from said service manager, wherein the first authentication method comprises an authentication via an identifier and the second authentication method comprises a digital certificate.

12. The system according to claim 11, wherein a location of said client device is local with respect to a location of said IMG.

13. The system according to claim 11, wherein a location of said client device is remote with respect to a location of said IMG.

14. The system according to claim 11, wherein said client device supports a first authentication method which is different from a second authentication method that is required by said service manager.

15. The system according to claim 11, wherein said client device uses a first cryptography method which is different from a second cryptography method that is used by said service manager.

16. The system according to claim 15, wherein said at least one of a processor and a circuit is further configured to enable said security process between said client device and said service manager by performing cryptography translation between said first cryptography method and said second cryptography method.

17. The system according to claim 11, wherein said client device does not have an authorization to access particular content received from said service manager; and said particular content is accessible to one or more of other client devices which have said authorization to access said particular content.

18. The system according to claim 17, wherein said at least one of a processor and a circuit is further configured to enable said security process between said client device and said service manager by performing access control conversion on said particular content for said client device, and said particular content remains accessible to said one or more of other client devices which have said authorization to access said particular content.

19. The system according to claim 18, wherein said at least one of a processor and a circuit is further configured to determine a billing information associated with said particular content for authorizing said client device to access said particular content.

20. The system according to claim 11, wherein said identifier further comprises a password login.

21. A method, comprising:
- identifying, by an IP multimedia gateway (IMG), a client device communicatively coupled to said IMG, the client device having a security capability incompatible with a security capability of a service manager, said client device not having an authorization to access content received from said service manager; and
- enabling, by said IMG, a security translation process between said client device and said service manager by performing access control conversion on said content to authorize said client device to access said content; and
- based on the security capability of the identified IMG, initiating said security translation process between a first cryptography method of said client device and a second cryptography method of said service manager to enable said client device to interpret said content received from said service manager, wherein said first cryptography method comprises a first authentication via a first cipher and said second cryptography method comprises a second authentication via a second cipher, wherein said first cipher is different from said second cipher.

22. The method according to claim 21, comprising determining a billing information associated with said content for authorizing said client device to access said content.

* * * * *